(12) United States Patent
Noguchi (10) Patent No.: US 11,630,630 B2
(45) Date of Patent: Apr. 18, 2023

(54) MULTIPLE SCREEN APPARATUS THAT CHANGES THE SCREEN CONTENTS BASED ON THE SCREEN ORIENTATION

(71) Applicant: FUJIFILM Business Innovation Corp., Tokyo (JP)

(72) Inventor: Yuki Noguchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 355 days.

(21) Appl. No.: 16/563,944

(22) Filed: Sep. 9, 2019

(65) Prior Publication Data

US 2020/0089462 A1    Mar. 19, 2020

(30) Foreign Application Priority Data

Sep. 19, 2018 (JP) .............................. JP2018-175248

(51) Int. Cl.
  *G06F 3/14* (2006.01)
  *G09G 5/373* (2006.01)

(52) U.S. Cl.
  CPC ........... *G06F 3/1446* (2013.01); *G09G 5/373* (2013.01); *G09G 2340/045* (2013.01); *G09G 2340/0492* (2013.01); *G09G 2354/00* (2013.01)

(58) Field of Classification Search
  None
  See application file for complete search history.

(56) References Cited

U.S. PATENT DOCUMENTS

| | | | |
|---|---|---|---|
| 9,495,061 B2 | 11/2016 | Fujiwaka | |
| 2004/0155869 A1* | 8/2004 | Robinson | G06F 3/0489 345/168 |
| 2010/0053081 A1* | 3/2010 | Jee | G06F 1/1652 345/157 |
| 2010/0064244 A1* | 3/2010 | Kilpatrick, II | H04M 1/0243 345/1.3 |

(Continued)

FOREIGN PATENT DOCUMENTS

| | | |
|---|---|---|
| JP | 5708644 | 4/2015 |
| JP | 2015064809 | 4/2015 |

OTHER PUBLICATIONS

Takashima et al, JP 2013246724 A, 2013; machine translation (Year: 2013).*

(Continued)

*Primary Examiner* — Steven Z Elbinger
(74) *Attorney, Agent, or Firm* — JCIPRNET (57) ABSTRACT

An information processing apparatus includes a first display screen, a second display screen, a detection unit, and a display controller. The detection unit detects switching between the first mode and the second mode. The first mode is a mode in which information is displayed on the first display screen. The second mode is a mode in which information is displayed on the first display screen and the second display screen. The display controller controls whether enlarged display or additional display is performed in accordance with a change in the orientation of the first display screen or an operation of specifying the information displayed on the first display screen. The change or the operation is performed in a certain time including a time point at which the detection unit detects switching from the first mode to the second mode.

14 Claims, 10 Drawing Sheets

(56) References Cited

U.S. PATENT DOCUMENTS

| | | | | |
|---|---|---|---|---|
| 2010/0156939 A1* | 6/2010 | Lee | ................... | G06F 1/1626 |
| | | | | 345/650 |
| 2015/0097755 A1* | 4/2015 | Kim | ................... | G06F 1/1641 |
| | | | | 345/1.3 |
| 2015/0331593 A1 | 11/2015 | Lee et al. | | |
| 2017/0076699 A1* | 3/2017 | Tichauer | ............... | G06F 1/1694 |
| 2017/0255320 A1* | 9/2017 | Kumar | ................. | G06F 1/1692 |

OTHER PUBLICATIONS

"Office Action of Japan Counterpart Application" with English translation thereof, dated Jul. 12, 2022, p. 1-p. 5.

\* cited by examiner

OPEN HORIZONTALLY

ROTATE & OPEN VERTICALLY

FIG. 13A

OPEN HORIZONTALLY

FIG. 13B

ROTATE & OPEN VERTICALLY

MULTIPLE SCREEN APPARATUS THAT CHANGES THE SCREEN CONTENTS BASED ON THE SCREEN ORIENTATION

CROSS-REFERENCE TO RELATED APPLICATIONS

This application is based on and claims priority under 35 USC 119 from Japanese Patent Application No. 2018-175248 filed Sep. 19, 2018.

BACKGROUND

(i) Technical Field

The present disclosure relates to an information processing apparatus and a non-transitory computer readable medium.

(ii) Related Art

Japanese Patent No. 5708644 discloses an information processing apparatus. The information processing apparatus includes a first display, a second display, and a controller. When an instruction to activate a first application is given, the controller displays the screen for the first application on one of the first display and the second display, and displays the screen of a second application on the other display. For each of the screens of the first application and the second application, the controller determines which display is to be used to display the screen on the basis of the relationship between the first application and the second application. The relationship is a relative positional relationship between a first icon indicating the first application and a second icon indicating the second application which are displayed on the first display or the second display. When the instruction to activate the first application is given, for each of the screens of the first application and the second application, the controller determines which display is to be used to display the screen on the basis of the positional relationship.

There is an information processing apparatus which includes multiple display screens and which may switch the number of display screens that are to be used. For example, when the information processing apparatus has two display screens, that is, a first display screen and a second display screen, the information processing apparatus may be used by switching between the first mode and the second mode. In the first mode, information is displayed on the first display screen. In the second mode, information is displayed on the first display screen and the second display screen. When the mode is switched from the first mode to the second mode, enlarged display or additional display may be selected. In the enlarged display, the screen of a common application is enlarged and displayed over the first display screen and the second display screen. In the additional display, information related to the display on the first display screen is additionally displayed on the second display screen. A user themselves needs to perform this selection every time the mode is switched from the first mode to the second mode.

However, selection between the enlarged display and the additional display at every switching to the second mode makes the operation complicated.

SUMMARY

Aspects of non-limiting embodiments of the present disclosure relate to an information processing apparatus and a non-transitory computer readable medium which may select the enlarged display or the additional display automatically in a transition to the second mode using multiple display screens.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a first display screen, a second display screen, a detection unit, and a display controller. The first display screen and the second display screen are capable of displaying information. The detection unit detects switching between a first mode and a second mode. The first mode is a mode in which information is displayed on the first display screen. The second mode is a mode in which information is displayed on the first display screen and the second display screen. The display controller controls whether enlarged display or additional display is performed in accordance with a change in an orientation of the first display screen or an operation of specifying the information displayed on the first display screen. The enlarged display is such that the information displayed in the first mode is enlarged and displayed also on the second display screen. The additional display is such that related information related to the information displayed in the first mode is additionally displayed on the second display screen. The change or the operation is performed in a certain time including a time point at which the detection unit detects switching from the first mode to the second mode.

BRIEF DESCRIPTION OF THE DRAWINGS

Exemplary embodiment of the present disclosure will be described in detail based on the following figures, wherein.

DETAILED DESCRIPTION

An exemplary embodiment of the technique provided by the present disclosure will be described below with reference to the drawings. In the drawings, identical or equivalent components and parts are given identical reference numerals. The ratios in size in the drawings may be exaggerated for the sake of description, and may be different from the actual ratios.

Figure 1:
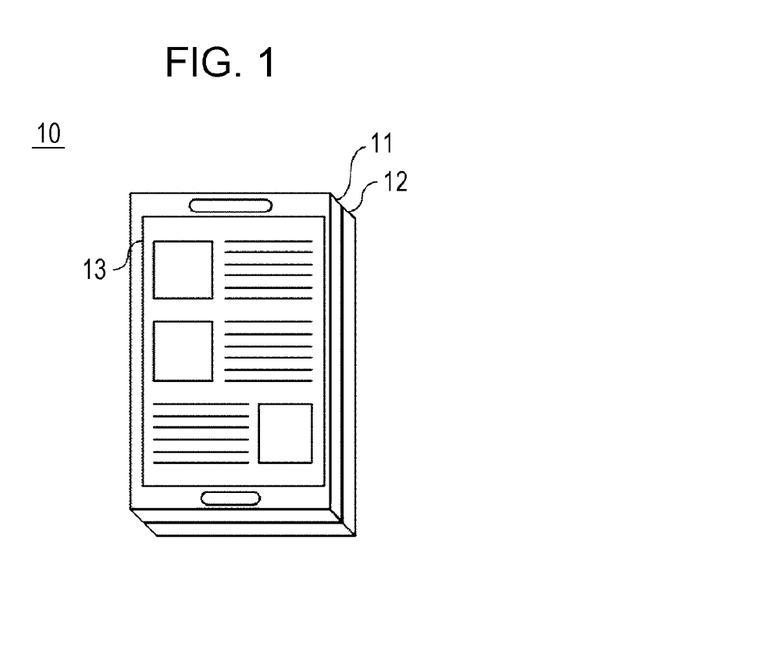
FIG. 1 is a diagram illustrating an exemplary terminal apparatus using information processing according to the present disclosure.
Figure 2:
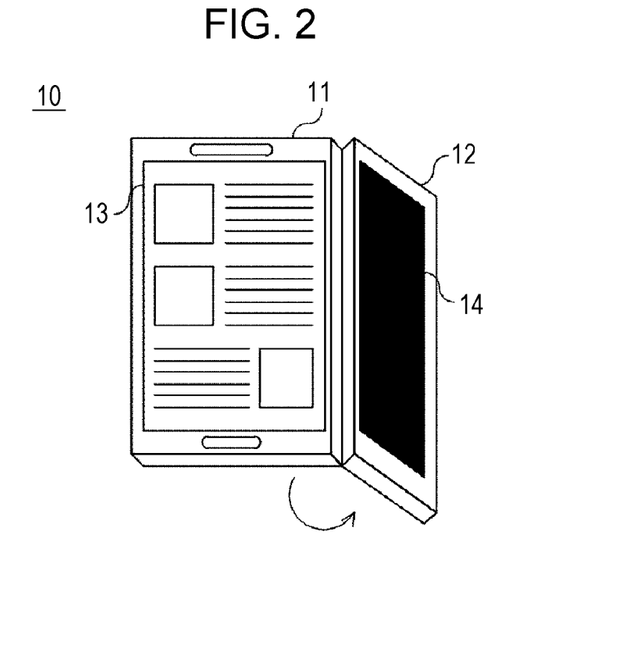
FIG. 2 is a diagram illustrating an operation for switching the terminal apparatus to the second mode.
Figure 3:
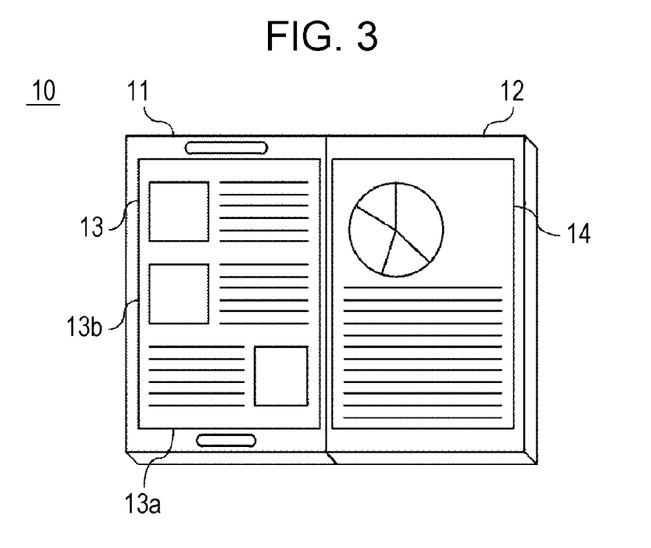
FIG. 3 is a diagram illustrating an exemplary display form of a second display screen.

FIG. 1 is a diagram illustrating an exemplary terminal apparatus using information processing provided by the present disclosure. FIG. 2 is a diagram illustrating an operation for switching the terminal apparatus to the second mode. FIG. 3 is a diagram illustrating an exemplary display form of a second display screen.

In the present exemplary embodiment, a terminal apparatus 10 is an information processing apparatus which is capable of displaying information in at least two display areas. The terminal apparatus 10 is a smartphone, a tablet, or a tablet computer. The terminal apparatus 10 may have various functions such as a calling function. The present exemplary embodiment focuses on the display function of the terminal apparatus 10, and forms and operations of the display function will be described.

As illustrated in FIG. 1, the terminal apparatus 10 includes a first display unit 11 and a second display unit 12 as a configuration in which at least two display areas are provided. As illustrated in FIG. 2, one of the first display unit 11 and the second display unit 12 pivots relative to the other from the state in which the first display unit 11 overlies the second display unit 12 as illustrated in FIG. 1. Thus, the first display unit 11 and the second display unit 12 are arranged side by side as illustrated in FIG. 3. Hereinafter, the state illustrated in FIG. 1 is called the state in which the second display unit 12 closes, and the state illustrated in FIG. 3 is called the state in which the second display unit 12 opens.

In the present exemplary embodiment, the terminal apparatus 10 provides two display areas by using a first display screen 13 displayed by the first display unit 11 and a second display screen 14 displayed by the second display unit 12. Hereinafter, the state in which the second display unit 12 closes and in which information is displayed on the first display screen 13 is called the first mode. The state in which the second display unit 12 opens and in which information is displayed on the first display screen 13 and the second display screen 14 is called the second mode.

The first display screen 13 has a rectangular display area in which, in the first mode in which information is not displayed on the second display screen 14, various types of information are displayed in accordance with an application which is being used by a user. Also in the second mode, various types of information are displayed on the first display screen 13 in accordance with an application which is being used by a user.

The second display screen 14 has a rectangular display area in which information is displayed in the second mode in which the second display unit 12 opens. On the second display screen 14, information displayed on the first display screen 13 is enlarged and the enlarged information is displayed, or information related to information displayed on the first display screen 13 is displayed.

In the example illustrated in FIG. 3, a document related to a document displayed on the first display screen 13 is displayed on the second display screen 14. Hereinafter, the case in which information related to that on the first display screen 13 is thus displayed on the second display screen 14 is called additional display.

Figure 4:
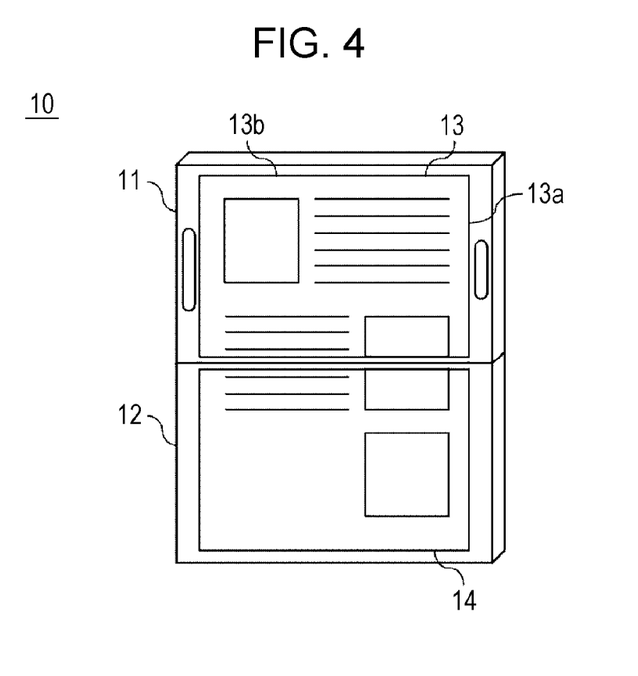
FIG. 4 is a diagram illustrating another exemplary display form using a second display screen.

FIG. 4 is a diagram illustrating another exemplary display form using a second display screen.

In the example illustrated in FIG. 4, the second display screen 14, along with the first display screen 13, displays the same information, for example, information about the same document. Thus, compared with the case of display only on the first display screen 13, the area in which the same information is displayed is larger by the area of the second display screen 14. That is, information having been displayed on the first display screen 13 is displayed also on the second display screen 14 in addition to the first display screen 13. Hereinafter, the case in which information having been displayed on the first display screen 13 is thus displayed over the first display screen 13 and the second display screen 14 is called enlarged display.

In addition to the additional display and the enlarged display which are described above, there is another form using the second display screen 14.

Figure 5:
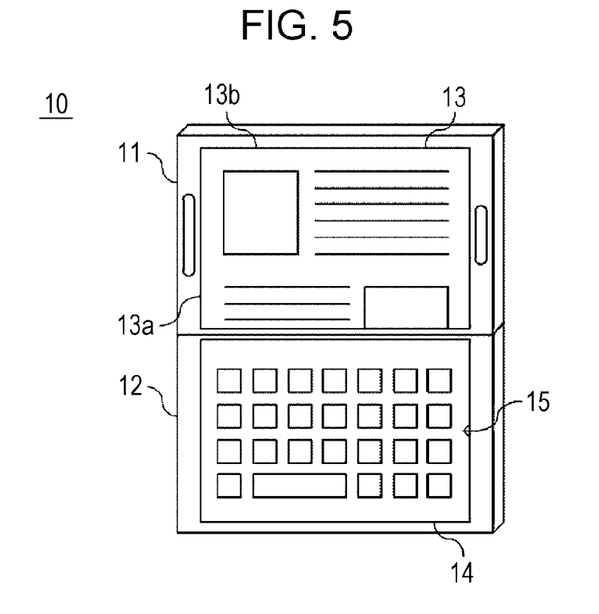
FIG. 5 is a diagram illustrating an example in which a first input unit is displayed on the second display screen.
Figure 6:
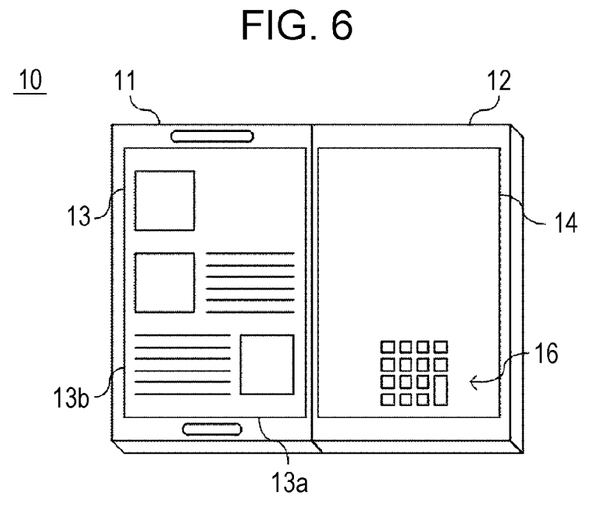
FIG. 6 is a diagram illustrating an example in which a second input unit is displayed on a second display screen.

FIG. 5 is a diagram illustrating an example in which a first input unit is displayed on a second display screen. FIG. 6 is a diagram illustrating an example in which a second input unit is displayed on a second display screen.

In the examples illustrated in FIGS. 5 and 6, information editable by an application which is being used by a user is displayed on the first display screen 13. Examples of editable information include document data editable by a document preparation application, table data editable by a table preparation application, and slide data editable by a slide document preparation application. The editable information is newly created and edited by a user performing key input or the like on a software keyboard or the like.

In the state in which the terminal apparatus 10 is in the first mode, in the case where editable information is displayed on the first display screen 13 and is further edited, a software keyboard is displayed in a part of the first display screen 13, for example, in a lower part, which is not illustrated. In this state, when a transition to the second mode is made, as illustrated in FIG. 5 or 6, an input unit, which is a software keyboard, is displayed on the second display screen 14.

In the form illustrated in FIG. 5, a first input unit 15 is displayed on the second display screen 14. The first input unit 15 is displayed as a keyboard, including all of the alphabet keys, in such a manner that, for example, the long side farther from the first display screen 13, among the two long sides of the second display screen 14, is located at a lower position. A user touches alphabet keys on the first input unit 15. Thus, characters are input.

In the form illustrated in FIG. 6, a second input unit 16 is displayed on the second display screen 14. The second input unit 16 is displayed as a keyboard, including keys indicating the lines (such as the line starting from the Japanese hiragana character, A) of the Japanese syllabary, in such a manner that, for example, one of the two short sides of the second display screen 14 is located at a lower position. A user uses the second input unit 16 to select a key representing the line having a character the user wants to input, and then perform a flick operation, a long-press operation, or the like. Thus, the character included in the line may be selected. Compared with the first input unit 15, the second input unit 16 has key arrangement suitable for being disposed in a narrow width.

As described above, as illustrated in FIGS. 3 to 6, information is displayed in various forms on the first display screen 13 and the second display screen 14. The flow describing which form is to be used will be described below. Before description about the flow, the hardware configuration and functional configuration of the terminal apparatus 10 will be described.

Figure 7:
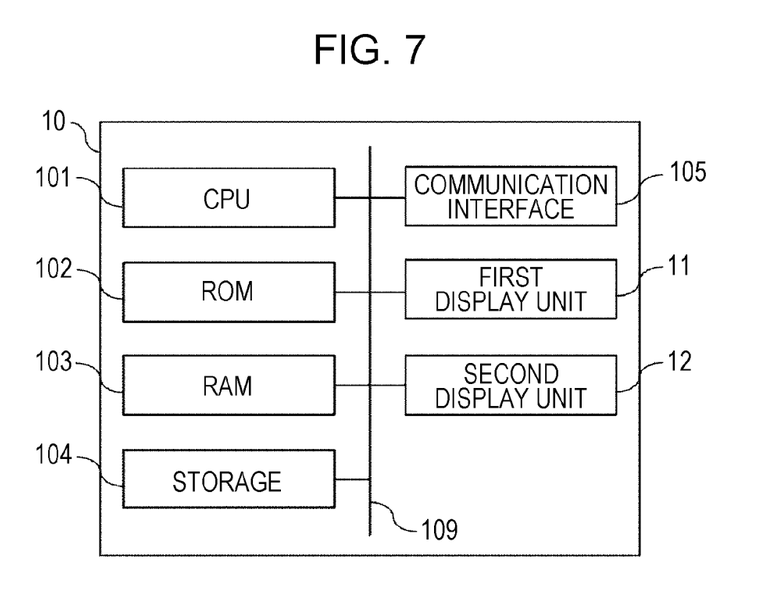
FIG. 7 is a block diagram illustrating the hardware configuration of a terminal apparatus.

FIG. 7 is a block diagram illustrating the hardware configuration of a terminal apparatus.

As illustrated in FIG. 7, the terminal apparatus 10 includes components of a central processing unit (CPU) 101, a read only memory (ROM) 102, a random access memory (RAM) 103, a storage 104, a communication interface 105, the first display unit 11, and the second display unit 12. The components are communicatively connected to one another via a bus 109.

The CPU 101 which is a central processing unit executes various programs and controls the units. That is, the CPU 101 reads a program from the ROM 102 or the storage 104, and uses the RAM 103 as a work area to execute the program. The CPU 101 controls the components described above and performs various computation processes according to programs recorded in the ROM 102 or the storage 104. In the present exemplary embodiment, an information processing program for controlling display of information in the terminal apparatus 10 is stored in the ROM 102 or the storage 104.

The ROM 102 is used to store various programs and various types of data. The RAM 103 serves as a work area for storing programs or data temporarily. The storage 104 is formed of a solid state drive (SSD) or a flash memory, and stores various programs including an operating system and various types of data.

The communication interface 105 is an interface for communicating with other equipment. For example, a standard, such as Ethernet™, the fiber distributed data interface (FDDI), or Wi-Fi™, is used.

The first display unit 11 and the second display unit 12, which are, for example, liquid-crystal displays, display various types of information. The first display unit 11 and the second display unit 12 employ a touch panel system to receive various inputs from a user.

Figure 8:
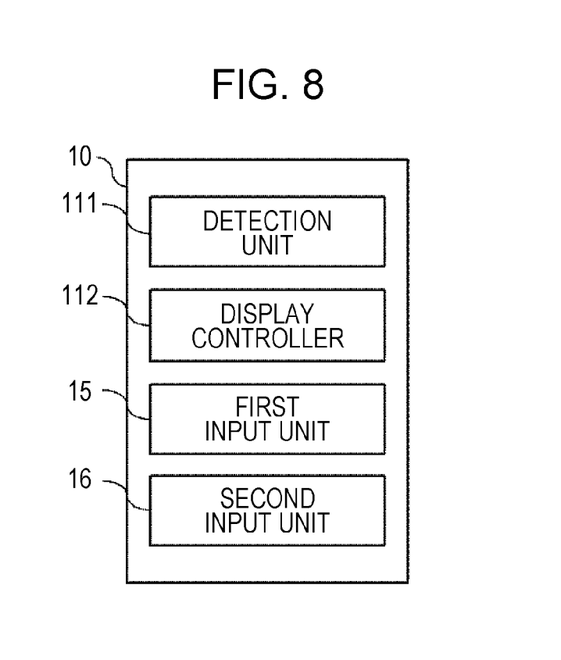
FIG. 8 is a block diagram illustrating an exemplary functional configuration of the terminal apparatus.

FIG. 8 is a block diagram illustrating an exemplary functional configuration of a terminal apparatus.

As illustrated in FIG. 8, the terminal apparatus 10 includes a detection unit 111, a display controller 112, the first input unit 15, and the second input unit 16. Each functional configuration is implemented by the CPU 101 reading the information processing program stored in the ROM 102 or the storage 104 and loading the program in the RAM 103 for execution.

The detection unit 111 detects switching between the first mode and the second mode. In the first mode, information is displayed on the first display screen 13. In the second mode, information is displayed on the first display screen 13 and the second display screen 14. Switching between the first mode and the second mode may be detected, for example, by monitoring the opening/closing state of the second display unit 12.

The display controller 112 controls whether the enlarged display illustrated in FIG. 4 or the additional display of related information illustrated in FIG. 3 is performed in accordance with a change in the orientation of the first display screen 13 in a certain time including the time point at which the detection unit 111 detects switching from the first mode to the second mode. The certain time including the time point at which switching from the first mode to the second mode is detected is specifically a time from the time point, from which a given time, which is any, has elapsed till the detection time point at which the switching is detected, to the time point at which the given time has elapsed from the detection time point. The given time may be set appropriately, and may be set, for example to a time between 0.1 second and 5 seconds. When the given time is set to one second, the display controller 112 checks if the orientation of the first display screen 13 has been changed in one second before the detection time point and one second after the detection time point.

A change in the orientation of the first display screen 13 indicates that a side whose direction is close to the horizontal direction is changed between the long side and the short side of the rectangular first display screen 13. For example, in FIGS. 3 and 4, assume that the downward direction in the figures indicates the gravitational direction. In this case, in FIG. 3, a short side 13a of the first display screen 13 is substantially parallel to the horizontal direction, and a long side 13b is substantially perpendicular to the horizontal direction. Therefore, in FIG. 3, the direction of the short side 13a is close to the horizontal direction. In FIG. 4, the short side 13a of the first display screen 13 is substantially perpendicular to the horizontal direction, and the long side 13b is substantially parallel to the horizontal direction. Therefore, in FIG. 4, the direction of the long side 13b is close to the horizontal direction. The display controller 112 specifies the following case as a change in the orientation of the first display screen. The case is that the side whose direction is close to the horizontal direction has been changed. In other words, which side, the short side 13a or the long side 13b of the first display screen 13, is located at a lower position in the terminal apparatus 10 held by a user is checked. The detection unit 111 may use the detection result from an acceleration sensor (not illustrated in FIG. 7) to detect which side, the short side 13a or the long side 13b of the first display screen 13, has a direction closer to the horizontal direction.

As described above with reference to FIGS. 5 and 6, the first input unit 15 and the second input unit 16 display different types of keyboards, and receive input of characters by using different input methods.

Operations of the terminal apparatus 10 will be described.

Figure 9:
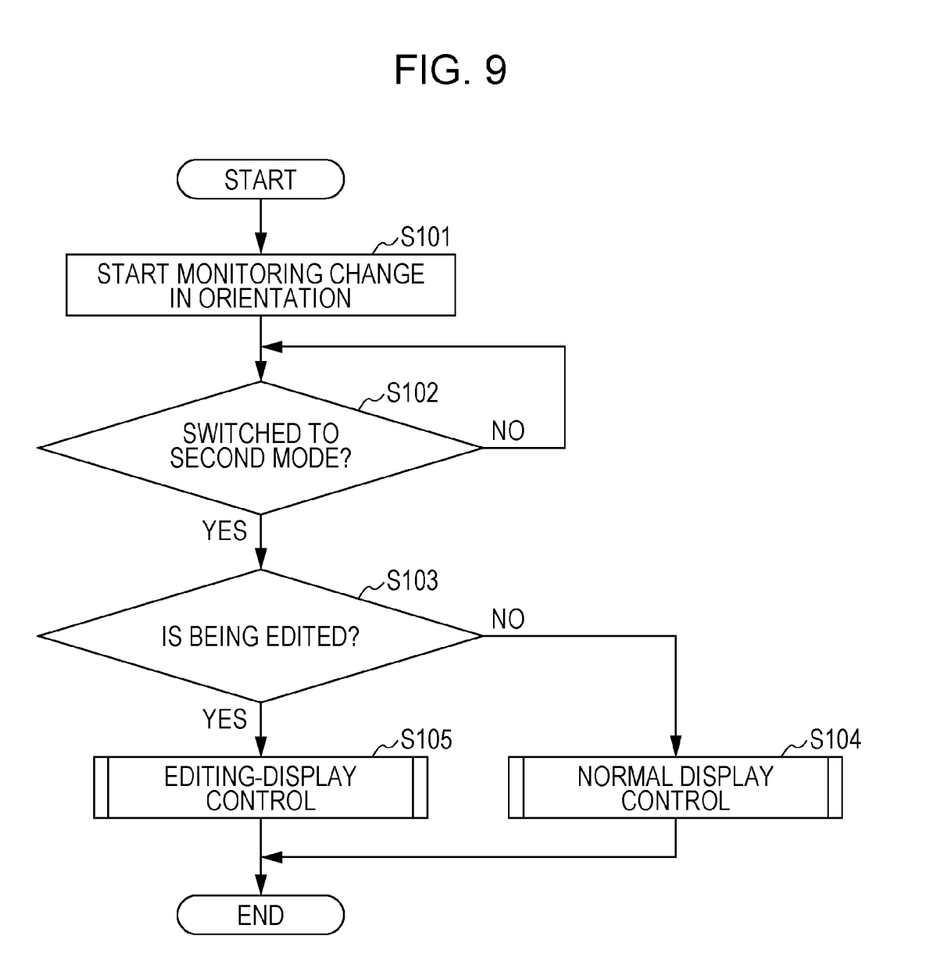
FIG. 9 is a flowchart of information processing performed by the terminal apparatus.

FIG. 9 is a flowchart of information processing performed by a terminal apparatus. The CPU 101 reads the information processing program from the ROM 102 or the storage 104, and loads the program in the RAM 103 for execution. Thus, the information processing is performed. In the present exemplary embodiment, as a precondition, a user uses the terminal apparatus 10 in the first mode at first.

The CPU 101 serving as the display controller 112 starts monitoring a change in the orientation of the first display screen 13 (step S101). The CPU 101 serving as the display controller 112 then determines whether or not the mode has been switched from the first mode to the second mode (step S102).

If the mode has not been switched to the second mode (NO in step S102), the CPU 101 waits until switching to the second mode is performed.

If switching to the second mode has been performed (YES in step S102), the CPU 101 determines whether or not the information having been displayed on the first display screen 13 in the first mode has been being edited (step S103).

If the information has not been being edited (NO in step S103), the CPU 101 performs normal display control (step S104). The normal display control will be described in detail below with reference to FIG. 10.

If the information has been being edited (YES in step S103), the CPU 101 performs editing-display control as exception handling (step S105). The editing-display control will be described in detail below with reference to FIG. 11.

Figure 10:
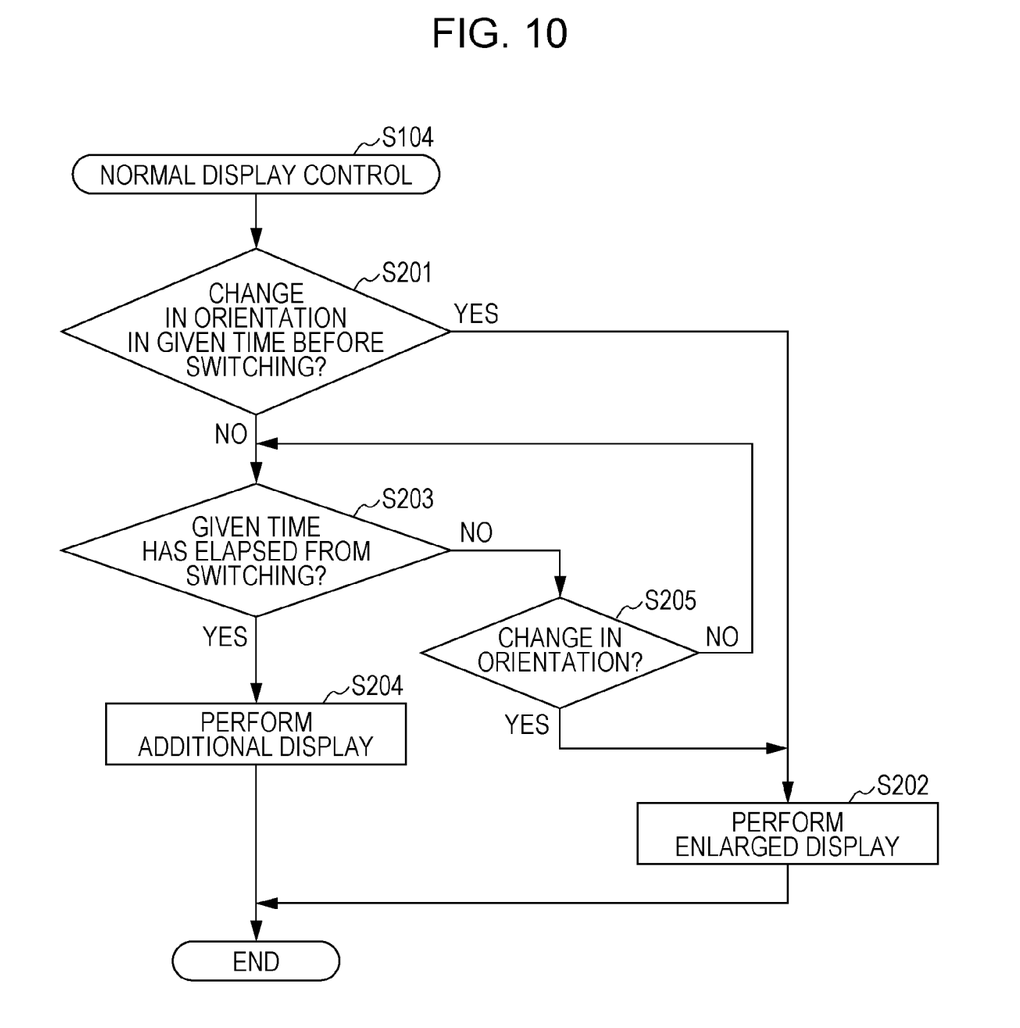
FIG. 10 is a flowchart of a normal display control process.

FIG. 10 is a flowchart of the normal display control process.

The CPU 101 determines whether or not the orientation of the first display screen 13 (terminal apparatus 10) has been changed in the given time before the switching to the second mode (step S201). If the orientation of the first display screen 13 has been changed (YES in step S201), for example, as illustrated in FIG. 4, the CPU 101 performs the enlarged display on the information having been displayed on the first display screen 13 in the first mode (step S202). The example illustrated in FIG. 4 indicates exemplary display of a screen obtained when the orientation, in which the direction of the short side 13a is closer to the horizontal direction, of the first display screen 13 is changed to the orientation, in which the direction of the long side 13b is closer to the horizontal direction, of the first display screen 13. However, even when the orientation, in which the direction of the long side 13b is closer to the horizontal direction, of the first display screen 13 is changed to the orientation, in which the direction of the short side 13a is closer to the horizontal direction, of the first display screen 13, the CPU 101 may perform the enlarged display similarly. For example, in the case where a user watches a moving image in the first mode with the orientation, in which the direction of the long side 13b is closer to the horizontal direction, of the first display screen 13, that is, with the landscape orientation, and where a transition to the second mode is made, assume that the user orients the terminal apparatus 10 so that the direction of the short side 13a of the first display screen 13 is closer to the horizontal direction. In this case, since both the first display screen 13 and the second display screen 14 are used in the second mode, if the combination of both the screens is regarded as a single screen, the first display screen 13 and the second display screen 14 form a landscape screen. The enlarged display causes a moving image to be displayed in a large area over the first display screen 13 and the second display screen 14.

If the orientation of the first display screen 13 has not been changed (NO in step S201), the CPU 101 determines whether or not the given time has elapsed from the time point of switching to the second mode (step S203). If the given time has elapsed (YES in step S203), for example, as illustrated in FIG. 3, the CPU 101 displays information, which is related to the information having been displayed on the first display screen 13 in the first mode, additionally on the second display screen 14 (step S204). The CPU 101 ends the normal display control process.

If the given time has not elapsed (NO in step S203), the CPU 101 determines whether or not the orientation of the first display screen 13 has been changed (step S205). If the orientation has not been changed (NO in step S205), the CPU 101 causes the process to return to step S203.

If the orientation has been changed (YES in step S205), the CPU 101 performs the enlarged display (step S202). The CPU 101 ends the normal display control process.

In the example illustrated in FIG. 10, which operation, the enlarged display or the additional display, is to be performed is determined in accordance with a change in the orientation of the first display screen 13. However, the present disclosure is not limited to this. For example, which operation, the enlarged display or the additional display, is to be performed may be determined in accordance with an operation of specifying information displayed on the first display screen 13 in the first mode. Specific examples of the operation of specifying information include a touch or swipe operation in any area of the first display screen 13 on which the information is displayed. Examples of any area include an area in which software keys for specific input, a software keyboard, or the like is not displayed. A touch operation or the like on the first display screen 13 provides confirmation of a user's intention to view the information.

When execution of the enlarged display or the additional display is determined in accordance with an operation of specifying information, in step S201 and step S205 in FIG. 10, whether or not an operation of specifying information has been performed, not whether or not the orientation has been changed, is determined. For example, in step S201, it is determined whether or not an operation of specifying the information displayed on the first display screen 13 has been performed in the given time before switching to the second mode. In step S205, it is determined whether or not an operation of specifying the information displayed on the first display screen 13 has been performed in the given time after switching to the second mode. Thus, when an operation of specifying the information has been performed, the specified information may be subjected to the enlarged display over the first display screen 13 and the second display screen 14. If an operation of specifying the information has not been performed, related information may be additionally displayed on the second display screen 14 in addition to the display on the first display screen 13.

The editing-display control will be described.

Figure 11:
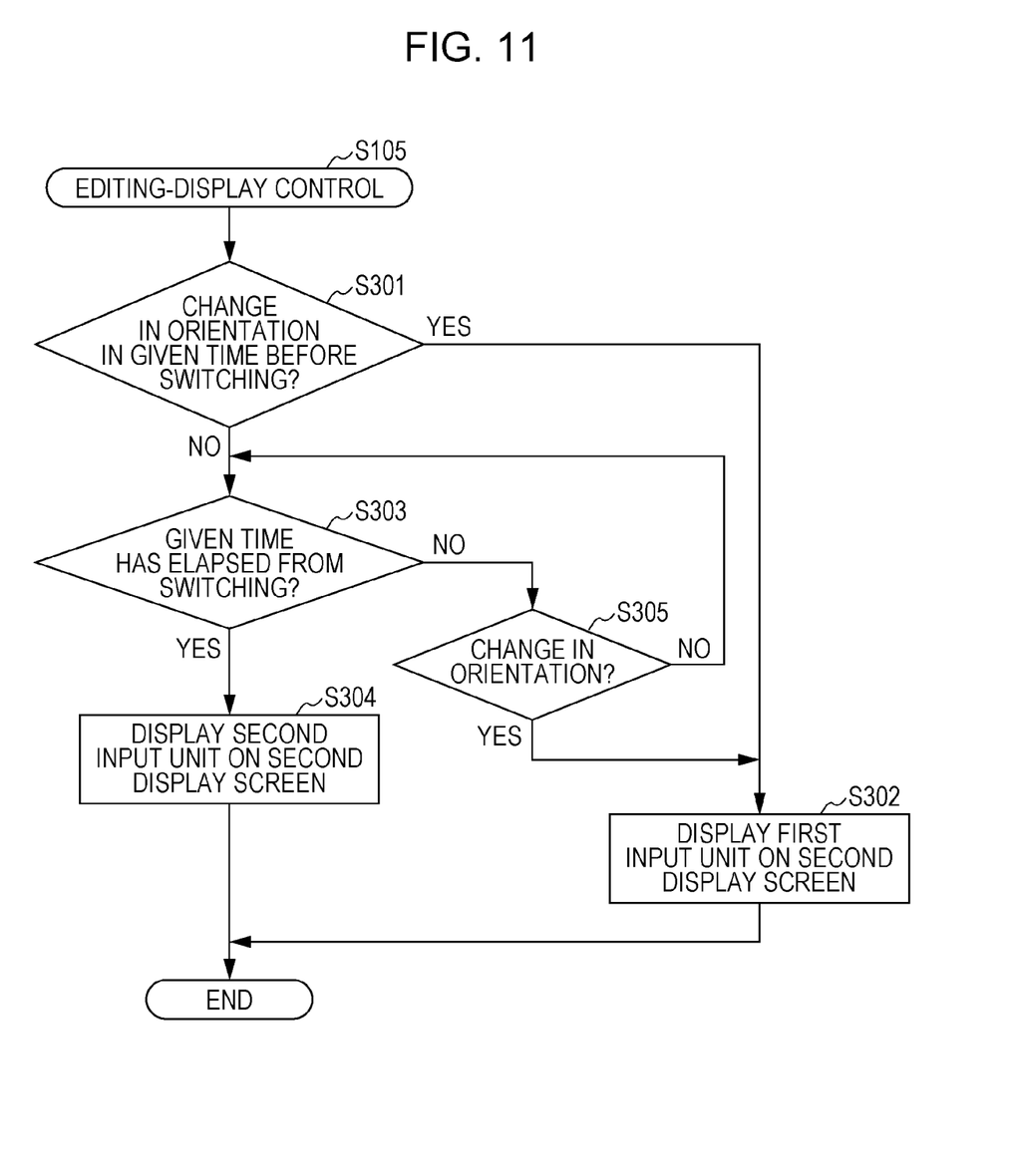
FIG. 11 is a flowchart of an editing-display control process.

FIG. 11 is a flowchart of the editing-display control process. As a precondition of the process in FIG. 11, a user is using the terminal apparatus 10 in the second mode with the orientation in which the direction of the short side 13a of the first display screen 13 is closer to the horizontal direction than that of the long side 13b.

The CPU 101 determines whether or not the orientation of the first display screen 13 has been changed in the given time before switching to the second mode (step S301). If the orientation of the first display screen 13 has been changed (YES in step S301), for example, as illustrated in FIG. 5, the CPU 101 causes the first input unit 15 to be displayed on the second display screen 14 (step S302).

If the orientation of the first display screen 13 has not been changed (NO in step S301), the CPU 101 determines whether or not the given time has elapsed from the time point of switching to the second mode (step S303). If the given time has elapsed (YES in step S303), for example, as illustrated in FIG. 6, the CPU 101 causes the second input unit 16 to be displayed on the second display screen 14 (step S304). The CPU 101 ends the editing-display control process.

If the given time has not elapsed (NO in step S303), the CPU 101 determines whether or not the orientation of the first display screen 13 has been changed (step S305). If the orientation has not been changed (NO in step S305), the CPU 101 causes the process to return to step S303.

If the orientation has been changed (YES in step S305), the CPU 101 causes the first input unit 15 to be displayed on the second display screen 14 (step S302). The CPU 101 ends the editing-display control process.

As illustrated in FIG. 6, when the second input unit 16 is displayed on the second display screen 14, software keys such as a tool bar for receiving various functions for editing information about the document or the like displayed on the first display screen 13 may be disposed in an empty space in the first display screen 14.

In the editing-display control process illustrated in FIG. 11, whether the first input unit 15 or the second input unit 16 is displayed on the second display screen 14 is controlled in accordance with a change in the orientation of the first display screen 13. However, this is not limiting. For example, whether the first input unit 15 or the second input unit 16 is displayed on the second display screen 14 may be controlled in accordance with which side, the short side 13a or the long side 13b of the first display screen 13 (the same if it is the second display screen 14) has a direction closer to the horizontal direction. For example, when the direction of the long side 13b of the first display screen 13 is closer to the horizontal direction than that of the short side 13a, as illustrated in FIG. 5, the first input unit 15 larger than the second input unit 16 is displayed. In contrast, when the direction of the short side 13a of the first display screen 13 is closer to the horizontal direction than that of the long side 13b, as illustrated in FIG. 6, the second input unit 16 is displayed.

Variations of the additional display and the enlarged display will be further displayed.

Figure 12A:
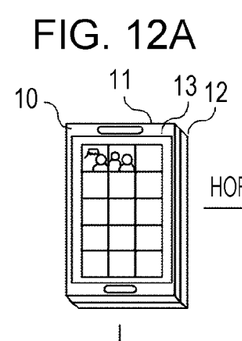
FIGS. 12A to 12C are diagrams illustrating the states in which a transition to the second mode is made when thumbnail images such as photographs are displayed.
Figure 12B:
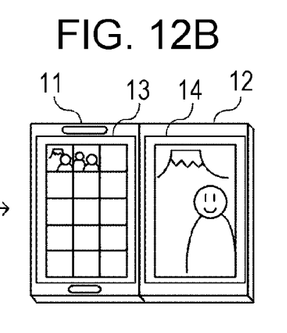
Figure 12C:
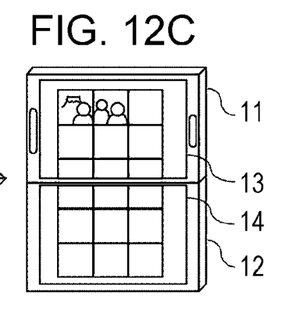

FIGS. 12A to 12C are diagrams illustrating the states in which a transition to the second mode is made when thumbnail images such as photographs are displayed.

As illustrated in FIG. 12A, the terminal apparatus 10 displays a list of photographs as thumbnail images on the first display screen 13. In this state, when a user opens the second display unit 12 to cause the terminal apparatus 10 to enter the second mode, the terminal apparatus 10 is in the state in FIG. 12B or 12C.

When the user opens the second display unit 12 and does not change the orientation of the terminal apparatus 10, as illustrated in FIG. 12B, the terminal apparatus 10 is in the state in which the second display unit 12 opens horizontally relative to the orientation in FIG. 12A. In this case, according to the information processing illustrated in FIGS. 9 and 10, the display on the first display screen 13 remains the same as the display in the first mode, and the list of thumbnail images is displayed. On the second display screen 14, for example, an enlarged image of the first photograph in the list of thumbnail images displayed on the first display screen 13 is displayed as a related image. Instead of the first photograph, an enlarged image of a photograph specified by a user in the list of thumbnail images may be displayed.

When a user opens the second display unit 12 and changes the orientation of the terminal apparatus 10 in the given times before and after the time point of switching to the second mode, as illustrated in FIG. 12C, the terminal apparatus 10 rotates relative to the orientation in FIG. 12A, and the second display unit 12 opens vertically. In this case, according to the information processing illustrated in FIGS. 9 and 10, the display on the second display screen 14 is such that the display in the first mode is enlarged and displayed over the first display screen 13 and the second display screen 14.

Figure 13A:
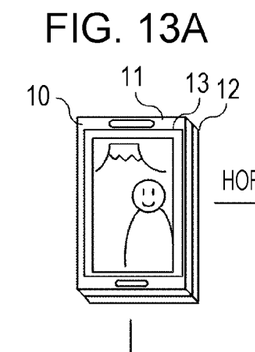
FIGS. 13A to 13C are diagrams illustrating the states in which a transition to the second mode is made when an image such as a photograph is displayed.
Figure 13B:
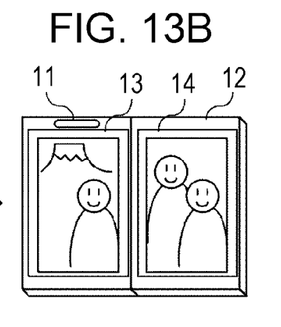
Figure 13C:
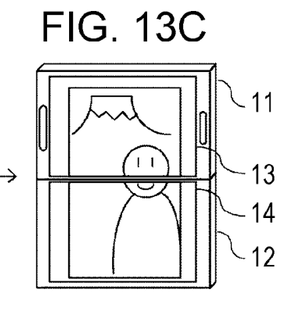

FIGS. 13A to 13C are diagrams illustrating the states in which a transition to the second mode is made when an image such as a photograph is displayed.

As illustrated in FIG. 13A, the terminal apparatus 10 displays an image such as a photograph on the first display screen 13. For example, when one photograph is selected from the thumbnail images as illustrated in FIG. 12A, as illustrated in FIG. 13A, a photograph is displayed on the first display screen 13. In this state, when a user opens the second display unit 12 and causes the terminal apparatus 10 to enter the second mode, the terminal apparatus 10 is in the state in FIG. 13B or 13C.

When a user opens the second display unit 12 and does not change the orientation of the terminal apparatus 10, as illustrated in FIG. 13B, the terminal apparatus 10 is in the state in which the second display unit 12 opens horizontally relative to the orientation in FIG. 13A. In this case, according to the information processing illustrated in FIGS. 9 and 10, the display on the first display screen 13 remains the same as the display in the first mode, and the photograph is displayed. On the second display screen 14, for example, the next photograph of the photograph displayed on the first display screen 13 is displayed as a related image. The next photograph is determined, for example, in accordance with the order of the thumbnail images in FIG. 12A.

When a user opens the second display unit 12 and changes the orientation of the terminal apparatus 10 in the given times before and after the time point of switching to the second mode, as illustrated in FIG. 13C, the terminal apparatus 10 rotates relative to the orientation in FIG. 13A, and the second display unit 12 opens vertically. In this case, according to the information processing illustrated in FIGS. 9 and 10, the display on the second display screen 14 is such that the display in the first mode is enlarged and displayed over the first display screen 13 and the second display screen 14.

In the exemplary embodiment described above, the form in which the second display unit 12 opens relative to the first display unit 11 of the terminal apparatus 10 in a transition to the second mode is described. However, the present disclosure is not limited to this.

Figure 14:
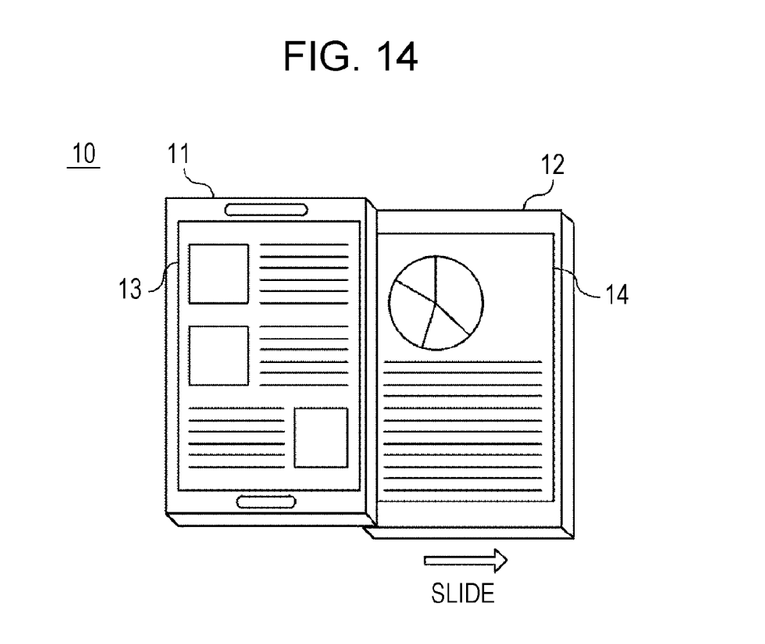
FIG. 14 is a diagram illustrating another form in which a second display unit opens relative to a first display unit of the terminal apparatus.

FIG. 14 is a diagram illustrating another form in which a second display unit opens relative to a first display unit of a terminal apparatus.

As illustrated in FIG. 14, the second display unit 12 positioned on the back of the first display unit 11 may be slid relative to the first display unit 11. Thus, the second display screen 14 of the second display unit 12 may activate, causing a transition to the second mode to be made.

In the exemplary embodiment described above, the case in which the first display unit 11 and the second display unit 12 display the first display screen 13 and the second display screen 14, respectively, is described. However, information screens are not only two screens of the first display screen 13 and the second display screen 14, and may be three or more screens. In the case where three or more display areas are provided, every time another display screen activates, information displayed on the activated display screen is determined on the basis of the exemplary embodiment described above.

The process described above may be implemented by using a dedicated hardware circuit. In this case, a single piece of hardware may be used for execution, or multiple pieces of hardware may be used for execution.

The program for operating the terminal apparatus 10 may be provided through a computer-readable recording medium, such as a Universal Serial Bus (USB) memory, a flexible disk, or a compact disc read only memory (CD-ROM), or may be provided online over a network such as the Internet. In this case, the program recorded in a computer-readable recording medium is typically transferred and stored in a memory, a storage, or the like. In addition, the program may be provided, for example, as a single piece of application software, or may be embedded, as one of the functions of the terminal apparatus 10, in software of apparatuses.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a first display screen and a second display screen that are capable of displaying information; and
a processor configured to:
detect switching between a first mode and a second mode by detecting a position of the first display screen relative to the second display screen or detecting a position of the second display screen relative to the first display screen, the first mode being a mode in which information is displayed on the first display screen, the second mode being a mode in which information is displayed on the first display screen and the second display screen; and
control whether enlarged display or additional display is performed in accordance with a change in a relative orientation between the first display screen and the second display screen, the enlarged display being such that the information displayed in the first mode is enlarged and displayed also on the second display screen, the additional display being such that related information related to the information displayed in the first mode is additionally displayed on the second display screen, the change in the relative orientation in a certain time including a time point at which the processor detects switching from the first mode to the second mode.

2. The information processing apparatus according to claim 1,
wherein the change in the orientation of the first display screen indicates changing a closer side between a long side and a short side of the rectangular first display screen, the closer side having a direction closer to a horizontal direction.

3. The information processing apparatus according to claim 2,
wherein the processor exerts control in such a manner that, when the closer side is changed between the long side and the short side of the first display screen in the certain time, the enlarged display is performed, the closer side having a direction closer to the horizontal direction.

4. The information processing apparatus according to claim 3,
wherein the operation of specifying the information displayed on the first display screen indicates a touch or swipe operation on any area on the first display screen.

5. The information processing apparatus according to claim 4,
wherein, when the touch or swipe operation is performed in the area of the first display screen in the certain time, the processor exerts control in such a manner that the enlarged display is performed.

6. The information processing apparatus according to claim 2,
wherein the operation of specifying the information displayed on the first display screen indicates a touch or swipe operation on any area on the first display screen.

7. The information processing apparatus according to claim 6,
wherein, when the touch or swipe operation is performed in the area of the first display screen in the certain time, the processor exerts control in such a manner that the enlarged display is performed.

8. The information processing apparatus according to claim 1,
wherein the operation of specifying the information displayed on the first display screen indicates a touch or swipe operation on any area on the first display screen.

9. The information processing apparatus according to claim 8,
wherein, when the touch or swipe operation is performed in the area of the first display screen in the certain time, the processor exerts control in such a manner that the enlarged display is performed.

10. The information processing apparatus according to claim 1,
wherein, when an operation for editing the information displayed on the first display screen is being performed on the first display screen, if a closer side is changed between a long side and a short side of the rectangular first display screen due to the change in the orientation of the first display screen in the certain time, the processor exerts control in such a manner that a first keyboard for character input is displayed on the second display screen, as exception handling instead of control of the enlarged display or the additional display, and, if the closer side is not changed in the certain time, the processor exerts control in such a manner that a software key and a second keyboard for character input are displayed on the second display screen, the closer side having a direction closer to a horizontal direction, the software key indicating a function of editing the information.

11. The information processing apparatus according to claim 10,
wherein the first keyboard and the second keyboard receive character input by using different input methods.

12. The information processing apparatus according to claim 11,
wherein the first keyboard receives character input through typing on a keyboard, and the second keyboard receives character input through a swipe operation.

13. A non-transitory computer readable medium storing a program causing a computer to execute a process for information processing, the process comprising:
detecting switching between a first mode and a second mode by detecting a position of the first display screen relative to the second display screen or detecting a position of the second display screen relative to the first display screen, the first mode being a mode in which information is displayed on the first display screen, the second mode being a mode in which info illation is displayed on the first display screen and the second display screen; and
controlling whether enlarged display or additional display is performed in accordance with a change in a relative orientation between the first display screen and the second display screen, the enlarged display being such that the information displayed in the first mode is enlarged and displayed also on the second display screen, the additional display being such that related information related to the information displayed in the first mode is additionally displayed on the second display screen, the change in the relative orientation in a certain time including a time point at which switching from the first mode to the second mode is detected.

14. An information processing apparatus comprising:
- means for detecting switching between a first mode and a second mode by detecting a position of the first display screen relative to the second display screen or detecting a position of the second display screen relative to the first display screen, the first mode being a mode in which information is displayed on the first display screen, the second mode being a mode in which information is displayed on the first display screen and the second display screen; and
- means for controlling whether enlarged display or additional display is performed in accordance with a change in a relative orientation between the first display screen and the second display screen, the enlarged display being such that the information displayed in the first mode is enlarged and displayed also on the second display screen, the additional display being such that related information related to the information displayed in the first mode is additionally displayed on the second display screen, the change in the relative orientation in a certain time including a time point at which switching from the first mode to the second mode is detected.

* * * * *